(12) United States Patent
Tesseraud

(10) Patent No.: US 8,205,345 B2
(45) Date of Patent: Jun. 26, 2012

(54) METHOD OF CORRECTING THE SHAPE OF A SENSED CURVE APPROXIMATING A LONGITUDINAL TRACE OF A BEZEL OF AN EYEGLASS FRAME, AND A METHOD OF ACQUIRING THE SHAPE OF AN OUTLINE OF SUCH A BEZEL

(75) Inventor: Romain Tesseraud, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 586 days.

(21) Appl. No.: 12/519,673

(22) PCT Filed: Dec. 14, 2007

(86) PCT No.: PCT/FR2007/002082
§ 371 (c)(1),
(2), (4) Date: Jun. 17, 2009

(87) PCT Pub. No.: WO2008/090284
PCT Pub. Date: Jul. 31, 2008

(65) Prior Publication Data
US 2010/0094589 A1    Apr. 15, 2010

(30) Foreign Application Priority Data
Dec. 18, 2006 (FR) ...................................... 06 11021

(51) Int. Cl.
G01B 11/24 (2006.01)
A61B 3/10 (2006.01)

(52) U.S. Cl. ................................ 33/200; 33/28; 702/167
(58) Field of Classification Search ................... 33/200, 33/28, 507, 1 M
See application file for complete search history.

(56) References Cited

U.S. PATENT DOCUMENTS

| | | | |
|---|---|---|---|
| 5,802,731 A | 9/1998 | Guillermin et al. | |
| 5,881,467 A * | 3/1999 | Clara et al. | 33/200 |
| 6,071,176 A * | 6/2000 | Kruis | 33/28 |
| 6,263,583 B1 * | 7/2001 | Mizuno | 33/28 |
| 6,427,350 B1 * | 8/2002 | Asaoka et al. | 33/507 |
| 6,591,208 B2 | 7/2003 | Lotze et al. | |
| 7,467,472 B2 * | 12/2008 | Jacq | 33/200 |
| 7,500,316 B2 * | 3/2009 | Haddadi | 33/200 |
| 7,571,545 B2 * | 8/2009 | Nauche et al. | 33/200 |
| 7,661,197 B2 * | 2/2010 | Jouard | 33/200 |
| 7,721,452 B2 * | 5/2010 | Koyama | 33/200 |

(Continued)

FOREIGN PATENT DOCUMENTS
EP    0 583 915    2/1994
(Continued)

OTHER PUBLICATIONS

International Search Report dated Jul. 7, 2008, from corresponding PCT application.

*Primary Examiner* — Yaritza Guadalupe-McCall
(74) *Attorney, Agent, or Firm* — Young & Thompson (57) ABSTRACT

The correction method includes searching for one or more anomalous zones (S1, S2), if any, of the sensed curve (19), and if one or more anomalous zones are found, correcting the shape of each anomalous zone of the sensed curve.

20 Claims, 3 Drawing Sheets

U.S. PATENT DOCUMENTS

| | | | |
|---|---|---|---|
| 2008/0022539 A1* | 1/2008 | Haddadi | 33/200 |
| 2008/0216330 A1* | 9/2008 | Jacq | 33/200 |
| 2008/0289200 A1* | 11/2008 | Jouard | 33/200 |
| 2009/0140036 A1* | 6/2009 | Haddadi | 33/200 |
| 2010/0064533 A1* | 3/2010 | Miyashita | 33/200 |
| 2010/0088056 A1* | 4/2010 | Igarashi et al. | 33/200 |
| 2010/0094589 A1* | 4/2010 | Tesseraud | 33/200 |
| 2010/0134756 A1* | 6/2010 | Divo et al. | 33/200 |
| 2010/0283968 A1* | 11/2010 | Freson et al. | 33/200 |
| 2011/0030520 A1* | 2/2011 | Joncour | 33/200 |
| 2011/0085132 A1* | 4/2011 | Dubois et al. | 33/200 |

FOREIGN PATENT DOCUMENTS

| | | |
|---|---|---|
| EP | 0 599 513 | 6/1994 |
| EP | 0 750 172 | 12/1996 |
| EP | 0 819 967 | 1/1998 |
| EP | 1 158 269 | 11/2001 |
| FR | 2 870 933 | 12/2005 |

* cited by examiner

METHOD OF CORRECTING THE SHAPE OF A SENSED CURVE APPROXIMATING A LONGITUDINAL TRACE OF A BEZEL OF AN EYEGLASS FRAME, AND A METHOD OF ACQUIRING THE SHAPE OF AN OUTLINE OF SUCH A BEZEL

TECHNICAL FIELD TO WHICH THE INVENTION RELATES

The invention relates in general to the field of eyeglasses, and more precisely to acquiring the shape of the outline of the bezel of a rim of a rimmed eyeglass frame.

The invention relates to a method of correcting the shape of a sensed curve that approximates a longitudinal trace of a bezel of a rim of an eyeglass frame, and also to a method of acquiring the shape of an outline of a bezel of a rim of an eyeglass frame, which method comprises: sensing the bezel by driving a feeler to slide or roll along the longitudinal direction of the bezel, while the feeler is being urged transversely towards the bottom of the bezel; deducing the shape of a sensed curve that approximates a longitudinal trace of the bezel; and correcting said shape of the sensed curve.

The invention finds a particularly advantageous application in tracing eyeglass frames that are highly cambered.

TECHNOLOGICAL BACKGROUND

The technical portion of the work of an optician consists in mounting a pair of ophthalmic lenses in a frame selected by a wearer. Such mounting comprises three main operations:
- acquiring the shape of the outline of the bezel in each of the two rims of the eyeglass frame selected by the future wearer, i.e. acquiring the shape of the groove that runs around the inside of each rim of the frame;
- centering each lens, which consists in determining the position that each lens is to occupy in the frame so as to be appropriately centered in front of the pupil of the wearer's eye so that the lens performs properly the optical function for which it is designed; and
- shaping each lens, which consists in machining or cutting out the outline of the lens to the desired shape, while taking account of the shape of the outline of the bezel and the defined centering parameters, together with an operation at the end of machining that consists in beveling so as to make a ridge on the edge face of the lens for engagement in the bezel in the rim of the frame, in order to hold the lens therein.

In the context of the present invention, attention is given mainly to the first operation of acquiring the shapes of the outlines of the bezels in the rims of the selected eyeglass frame.

In practice, the optician begins by sensing the bottoms of the grooves in each of the two rims of the selected eyeglass frame so as to determine accurately the coordinates of a plurality of points that characterize the shape of a longitudinal trace of the bezel of each rim (in practice this curve coincides with the bottom edge of the bezel). Knowledge of the shape of this curve then enables the optician to deduce the approximate shape that needs to be presented by the outline of the lens for machining so as to enable it to be inserted in the corresponding rim of the eyeglass frame.

Since the bezel generally presents a V-shaped section, the purpose of this operation is specifically to follow very exactly the bottom of the bezel included in the rim being sensed, so as to be able to store an accurate digital image of the shape of the outline of the bezel.

With frames that are highly "curved" and "skewed", i.e. that are highly cambered and twisted, merely sensing the bezel does not give results that are satisfactory. The Applicant has found that in spite of the care taken while sensing the bezel of such eyeglass frames, there often remain difficulties in engaging lenses in such frames.

OBJECT OF THE INVENTION

In order to remedy the above-mentioned drawback of the state of the art, the present invention proposes a more precise method of acquiring the shape of the outlines of the bezels in the rims of eyeglass frames.

More particularly, the invention provides a method of correcting the shape of a sensed curve approximating a longitudinal trace of a bezel of a rim of an eyeglass frame, the method comprising:
- searching for one or more anomalous zones, if any, of the sensed curve; and
- if one or more anomalous zones are found, correcting the shape of each anomalous zone of the sensed curve.

The term "longitudinal trace of the bezel" is used herein to mean a trace forming part of one or the other of the flanks of the bezel and running parallel to or coinciding with the bottom edge of the bezel. In other words, at each cross-section of the bezel, each longitudinal trace presents a tangent that is parallel to the tangent to the bottom edge of the bezel.

The Applicant has observed that with frames that are highly cambered, merely pressing the feeler against the bezel in the mean plane of the rims of the eyeglass frame does not enable the feeler to follow the bottom of the bezel accurately. When the "skew" (or twist) of the frame is very great and when one of the flanks of the bezel is steeply inclined, it can happen that the feeler slides on said flank away from the bottom of the bezel without the optician being aware of this departure. Consequently, while sensing the bezel, the exact shape of a longitudinal trace of the bezel (coinciding with the bottom edge of the bezel) is not acquired, but rather the shape of a sensed curve that approximates to said longitudinal trace.

The invention sets out to identify anomalous zones and to correct the shape sensed for the curve in those zones only.

In a first implementation of the invention, the search for said anomalous zones, if any, of the sensed curve comprises searching for zones in which the first or second derivative of a first function of at least one of the three coordinates of the sensed curve relative to a second function of at least one other one of the three coordinates of the sensed curve has an absolute value that exceeds a threshold value, which threshold value is fixed or relates to the frame under consideration.

In order to detect the zones in which the feeler has departed from the bottom of the bezel, it is appropriate to make use of the fact that this error in sensing the bezel gives rise to the feeler presenting greater acceleration or higher speed than that which would normally be possible if the feeler had remained in contact with the bottom of the bezel.

When the feeler departs from the bottom of the bezel by sliding along one of the flanks of the bezel, the acceleration of the feeler oscillates abnormally and takes on large values. Thus, a zone of the bezel can be considered as being an anomalous zone when the oscillations of the acceleration of the feeler in said zone become very large.

The invention thus proposes using the shape of the curve sensed along the bezel to determine the acceleration or the speed presented by the feeler as it is sensing the bezel, and to deduce therefrom the positions of zones in which the feeler departed from the bottom of the bezel, and then to acquire the shape of a curve that approximates better to the longitudinal trace of the bezel by correcting the shape of the initially-sensed curve in the anomalous zones.

Advantageously, the search for any anomalous zones of the sensed curve comprises searching for any angular sectors measured about an axis lying inside the sensed curve and extending generally transversely relative thereto, in which the first or second derivative of a radial and/or axial coordinate of the sensed curve relative to another coordinate of the sensed curve that is an angular coordinate has an absolute value that is greater than said threshold value.

In a second implementation of the invention, the search for any anomalous zones in the sensed curve comprises the following steps:
- subdividing the sensed curve into a plurality of subdivision portions;
- calculating an interpolation curve portion between the ends of each subdivision portion of the sensed curve;
- searching amongst the subdivision portions of the sensed curve for any abnormal subdivision portions that differ from the corresponding interpolation curve portion by more than a given threshold value; and
- determining said anomalous zones as a function of any abnormal subdivision portions found.

Thus, if the distance or the area between the interpolation curve and the sensed curve exceeds a threshold value, that means that the bezel was not sensed correctly in that zone. It is then appropriate to determine more precisely the shape of the sensed curve in that zone.

Advantageously, the subdivision portions of the sensed curve overlap in part.

The threshold value may be determined in several ways.

It may be predetermined and common to a plurality of eyeglass frames.

By sampling eyeglass frames representative of all existing eyeglass frames, a mean threshold value is calculated that is suitable for set of frames, i.e. that makes it possible to determine whether or not the feeler has departed from the bottom of the bezel for each frame in the set.

Said threshold value may be calculated as a function of variations over all or part of the sensed curve in the first or the second derivative of a first function of at least one of the three coordinates of the sensed curve relative to a second function of at least another one of the three coordinates of the sensed curve.

The threshold value may be calculated as a function of the standard deviation of the variation over all or part of the sensed curve in the first or second derivative of a first function of at least one of the three coordinates of the sensed curve relative to a second function of at least another one of the three coordinates of the sensed curve.

Said threshold value may be deduced at least in part from a degree of camber of the eyeglass frame calculated from the shape of the sensed curve.

Thus, when the eyeglass frame is identified as having little camber, and the risk of the feeler departing from the bottom of the bezel is small, then the threshold value can be increased so as to reduce the number of anomalous zones, thereby reducing the time required for calculating the real shape of the outline of the bezel. This also reduces the probability of defining a zone of the bezel as being an anomalous zone (i.e. a poorly-sensed zone) even though it was in fact sensed correctly. In contrast, when the eyeglass frame is identified as being highly cambered, and the risk of the feeler departing from the bottom of the bezel is large, then the threshold value can be decreased so as to ensure that all zones that are poorly sensed are indeed detected. The degree of camber of the frame can be calculated from the shape of the curve as sensed along the bezel. It can also be determined on sight by the optician who then inputs this data into the bezel outline tracer appliance being used.

According to an advantageous characteristic of the invention, the search for any anomalous zones is performed solely in the temporal portion of the rim of the eyeglass frame. Since frames are generally skew only in the temporal portions of the frame rims, the feeler risks departing from the bottom of the bezel only in those zones of the rims of the frame. Consequently, a search for anomalous zones is performed only in the temporal portions of the rims of the frame, thereby enabling the time required for calculating the real shape of the outline of the bezel to be decreased, but without that running the risk of degrading the accuracy of the calculations performed.

The shape of each anomalous zone of the sensed curve may be corrected:
- by sensing each anomalous zone of the outline of the bezel again, the feeler being controlled during this new sensing operation in application of second transverse and/or longitudinal position and/or force setpoints that depend on the anomalous zones found; or
- by replacing the shape of each anomalous zone of the sensed curve with a shape that is reconstructed by calculation in application of continuity criteria involving differentiation of order greater than or equal to 1 relative to zones of the sensed curve that are adjacent to said anomalous zone; or indeed
- by sensing a plurality of points of the anomalous zone of the bezel and replacing the shape of the sensed curve in each anomalous zone with a shape that is reconstructed by interpolation based on said sensed points.

The invention also provides a method of acquiring the shape of the outline of a bezel of a rim of an eyeglass frame, the method comprising sensing the bezel by driving a feeler to slide or roll along the longitudinal direction of the bezel, the feeler being urged transversely towards the bottom of the bezel, with the shape deduced for a sensed curve approximating a longitudinal trace of the bezel, and said shape of the sensed curve being corrected as defined above.

Advantageously, the bezel is sensed by controlling the feeler in application of first transverse and/or longitudinal position and/or force setpoints, the shape of each anomalous zone of the sensed curve being corrected by sensing each anomalous zone of the outline of the bezel again, the feeler being controlled during this new sensing operation in application of second transverse and/or longitudinal position and/or force setpoints that are different from said first setpoints.

In which case, advantageously, an additional step is provided of verifying that the eyeglass frame has remained stationary while sensing the bezel. It can happen that as a result of the forces generated by the feeler against the rim of the eyeglass frame, the frame moves while the bezel is being sensed. Such movement of the frame runs the risk of falsifying the tracing of the shape of the outline of the bezel, and consequently of falsifying the result of a search for anomalous zones in the bezel. It is therefore appropriate to ensure that the frame has not moved. On finishing sensing of the bezel, verifying that the starting and finishing points of the feeler coincide can serve, for example, to ensure that the frame has not moved.

To be even more certain, it is also possible to sense the bezel by controlling the feeler so that it makes more than one complete revolution, thereby tracing a given zone of the bezel twice over. By verifying that positions coincide in this starting and ending sensing zone, it is possible to ensure that the eyeglass frame has not moved.

If the eyeglass frame has not remained stationary, then the entire outline of the bezel is sensed again, and the shape of the sensed curve is deduced therefrom.

DETAILED DESCRIPTION OF AN EMBODIMENT

The following description with reference to the accompanying drawings, given as non-limiting examples, shows clearly what the invention consists in and how it can be reduced to practice.

In order to implement the method of the invention, it is necessary to have an appliance for tracing the shape of the outlines of bezels in the rims of eyeglass frames. This tracer appliance is well known to the person skilled in the art and does not in itself constitute the subject matter of the invention described. For example, it is possible to use a tracer appliance as described in patent EP 0 750 172 or as sold by Essilor International under the trademark Kappa or under the trademark Kappa CT.

Figure 1:
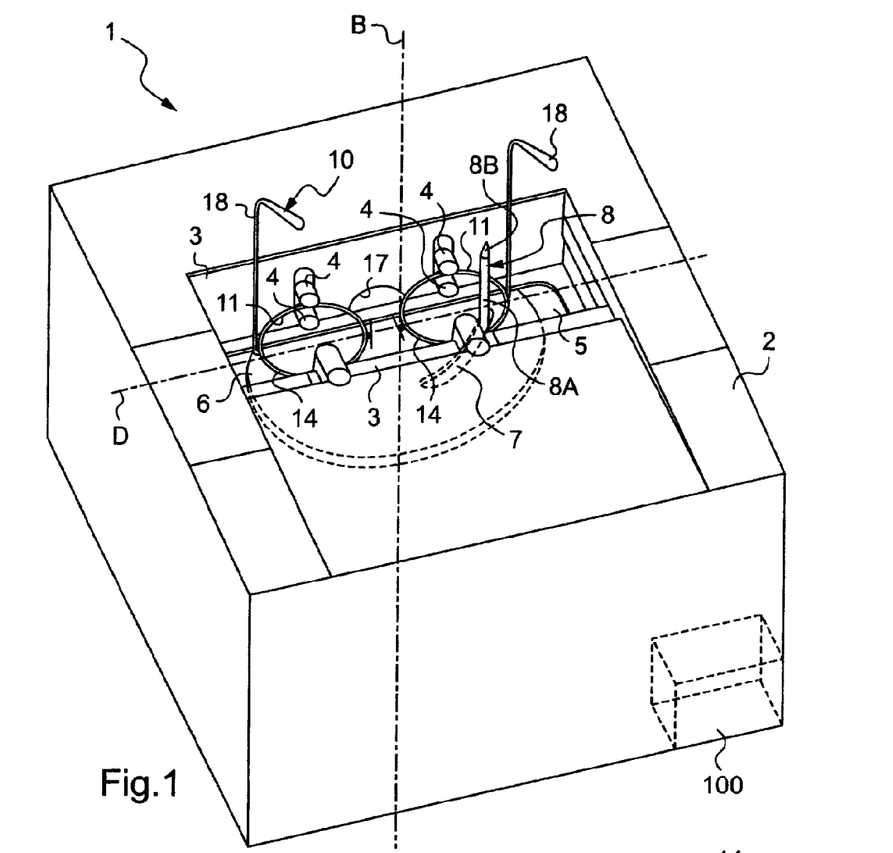
FIG. 1 is an overall perspective view of an appliance for tracing the shape of the outline of the bezel of a frame for eyeglasses.

FIG. 1 is a general view of the tracer appliance 1, as seen by its user. The appliance comprises a top cover 2 covering all of the appliance with the exception of a central top portion.

The tracer appliance 1 is for tracing the shape of the inside outlines of the bezels 11 of an eyeglass frame 10 selected by a wearer.

The eyeglass frame 10 shown here is of the rimmed type. It has two rims 14, i.e. a right rim and a left rim designed to be positioned respectively in front of the right eye and of the left eye of the wearer when the wearer is wearing said frame. It also includes a bridge 17 interconnecting the two rims 14, and two temples 18, each connected to a respective one of the two rims 14. Each of the rims of the eyeglass frame 10 is suitable for receiving an ophthalmic lens that is provided on its edge with a bevel.

Figure 2:
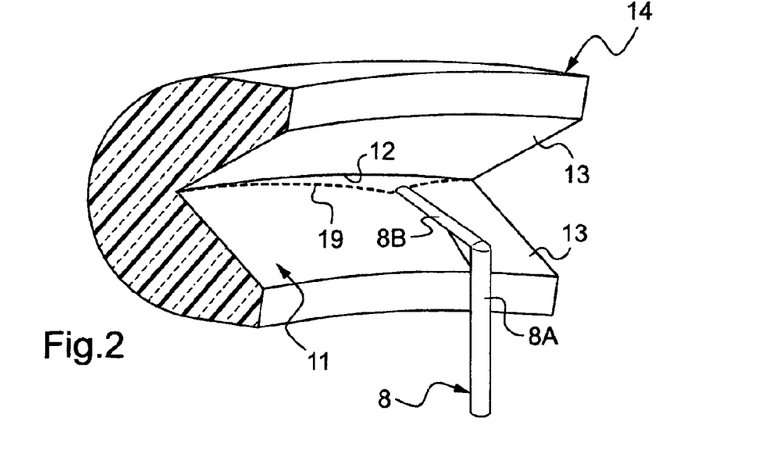
FIG. 2 is a perspective view of a portion of a bezel of the FIG. 1 eyeglass frame.

As shown in FIG. 2, each of the two rims 14 has an inside groove, commonly referred to a bezel 11, and the bevel of the corresponding lens is shaped to engage therein. In this example, each bezel 11 presents a section that is V-shaped, comprising a bottom edge 12 between two flanks 13. In a variant, it could present a section of a shape that is slightly different, for example a U-shape.

The term "longitudinal trace of the bezel" is used herein to designate any trace lying on one or other of the flanks of the bezel and running parallel to or coinciding with the bottom edge 12 of the bezel 11. In particular, consideration is given to a first longitudinal trace that coincides with the bottom edge 12 of the bezel 11.

The eyeglass frame 10 shown is cambered, such that the bezels 11 are skewed, i.e. twisted. Consequently, each cross-section of the bezel 11 presents its own angle of inclination. This angle of inclination is generally minimal in the nose regions of the rims of the frame (close to the bridge 17) and at its greatest close to the temple regions of the rims of the frame (close to the zones where the temples 18 are attached to the rims 14 of the frame).

The tracer appliance 1 shown in FIG. 1 has a set of two jaws 3, with at least one of the jaws 3 being movable relative to the other so that the jaws 3 can be moved towards each other or apart from each other so as to form a device for clamping the frame. Each of the jaws 3 is also provided with two pincers, each formed by two movable studs 4 so as to be suitable for clamping between them the eyeglass frame 10 so as to prevent it from moving.

In the space left visible by the central top opening of the cap 2, there can be seen a structure 5. A plate (not shown) is capable of moving in translation on the structure 5 along a transfer axis D. The plate has a turntable 6 mounted to rotate thereon. The turntable 6 is thus suitable for taking up two positions on the transfer axis D, a first position in which the center of the turntable 6 is disposed between the two pairs of studs 4 holding the right rim of the eyeglass frame 10, and a second position in which the center of the turntable 6 is located between the two pairs of studs 4 holding the left rim of the eyeglass frame 10.

The turntable 6 possesses an axis of rotation B defined as the axis normal to the front face of the turntable 6 and passing through its center. It is suitable for turning relative to the plate. The turntable 6 also has an oblong slot 7 in the shape of a circular arc through which there projects a feeler 8 comprising a support rod 8A, and at its free end, a feeler finger 8B for following the longitudinal trace of each bezel 11 of the eyeglass frame 10, making contact by sliding, or possibly by rolling.

The tracer appliance 1 includes actuator means (not shown) suitable firstly for causing the support rod 8A to slide along the slot 7 so as to move it away from or towards the center of the turntable 6, and secondly to position the feeler finger 8B of the feeler 8 at a greater or smaller altitude relative to the plane of the front face of the turntable 6.

To summarize, the feeler 8 is provided with three degrees of freedom: a first degree of freedom referenced TETA [French for the Greek letter theta] constituted by the ability of the feeler 8 to pivot about the axis of rotation B as a result of the turntable 6 turning relative to the plate; a second degree of freedom referenced Z constituted by the ability of the feeler 8 to move axially in translation along an axis parallel to the axis of rotation B of the turntable 6; and a third degree of freedom referenced R constituted by the ability of the feeler 8 to move radially relative to the axis of rotation B by virtue of its freedom to move along the circular arc formed by the slot 7.

Each point sensed by the end of the feeler finger 8B of the feeler 8 is identified in a corresponding coordinate system R, TETA, Z.

The tracer appliance 1 also has means for acquiring the position R, TETA, Z of the end of the feeler finger 8B of the feeler 8.

It also has control means for controlling the actuator means of the appliance, for the purpose of controlling the position of the end of the feeler finger 8B of the feeler 8.

These acquisition means and control means are together incorporated in an electronic and/or computer device 100 serving firstly to actuate the actuator means of the appliance, and secondly to receive and record the data transmitted thereto by sensors incorporated in the tracer appliance 1.

With reference to FIG. 1, in order to implement the method of the invention, prior to starting sensing of the bezel 11 of each rim 14 of the eyeglass frame 10, the eyeglass frame 10 is initially fastened in the tracer appliance 1. For this purpose, the frame is inserted between the studs 4 of the jaws 3 so that each of the rims of the frame is ready to be sensed along a path that begins with the feeler 8 being inserted between two studs 4 corresponding to the bottom portion of the frame, and then moving along the bezel 11 of the frame so as to cover the entire circumference of the rim 14 of the eyeglass frame 10.

The description below relates more particularly to acquiring the shape of the outline of the bezel in the left rim of the eyeglass frame.

Figure 3:
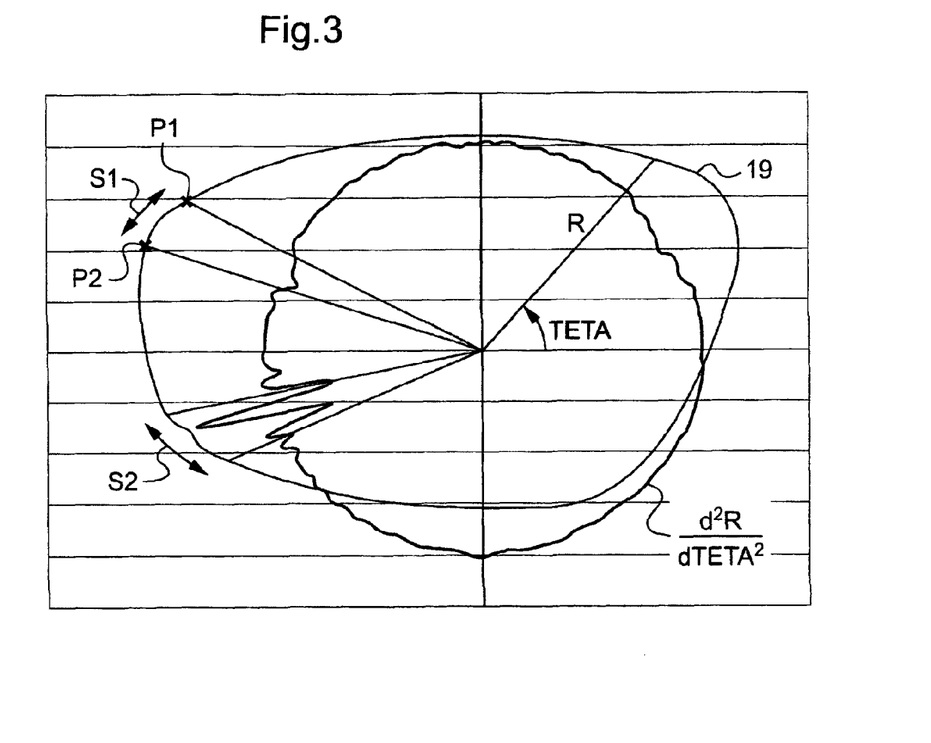
FIG. 3 is a plan view of a curve as sensed approximating the shape of the outline of the bezel of the FIG. 1 eyeglass frame superposed on a graph in polar coordinates plotting variation in the radial acceleration of the feeler of the FIG. 1 tracer appliance.

As shown in FIG. 3, the acquisition means define an angular position TETA of the feeler 8 as being zero when the end of the feeler is disposed beside the nose region of the rim 14 of the frame, at right angles relative to its position for insertion between the two studs 4.

Once the eyeglass frame 10 has been fastened, the control means cause the turntable 6 to turn so that the end of the feeler 8 moves longitudinally along the bottom edge 12 of the bezel 11.

Contact between the feeler finger 8B and the bezel 11 is conserved by the actuator means. These means exert a radial return force on the feeler 8 directed towards the bezel 11, thereby enabling the feeler finger 8B to remain in contact with the bezel 11.

Thus, the angular position TETA of the feeler 8 about the axis of rotation B is controlled and the feeler is also guided along its radial coordinate R and its altitude Z by the V-shape of the bezel.

The sensors of the tracer appliance 1 act during turning of the turntable 6 to read the three-dimensional coordinates of a plurality of points of the bezel, e.g. 360 points, so as to store an accurate digital image of the outline of the bezel 11.

The particular purpose of this operation is to ensure, throughout the entire duration of the sensing of the bezel 11, that the feeler remains as much as possible in contact with the bottom edge 12 of the bezel 11.

Nevertheless, as shown in FIG. 2, when the frame is highly curved so that certain regions of the bezel 11 are very skew, it can happen that the feeler slides along one of the flanks 13 of the bezel and moves away from the bottom edge 12 of the bezel.

The electronic and/or computer device 100 thus deduces from such sensing, not the exact shape of the first longitudinal trace (coinciding with the bottom edge of the bezel), but rather the shape of a sensed curve 19 that approximates the shape of the first longitudinal trace of the bezel.

The object of the invention is thus to redefine the shape of the sensed curve 19 in regions where the feeler 8 has moved away from the bottom of the bezel 11 so as to define a new shape for the sensed curve that comes closer to the shape of the first longitudinal trace.

After the operation of sensing the bezel 11 of the left rim 14 of the eyeglass frame 10, the electronic and/or computer device 100 proceeds with a step of verifying that the eyeglass frame 10 remained stationary throughout the time the bezel 11 was being sensed. For this purpose, it compares the three-dimensional coordinates of the starting and finishing points of the feeler 8. If the frame has remained stationary throughout the sensing of the bezel 11, then these points coincide. Otherwise, if the frame has moved, then these points present different three-dimensional coordinates. Under such circumstances, the electronic and/or computer device proceeds to sense the entire outline of the bezel 11 a second time.

In a variant, it is also possible to sense the bezel by controlling the feeler so that it performs more than a complete revolution, so as to trace a given zone of the bezel twice. Verifying that the positions in this starting and finishing zone for sensing coincide make it possible to ensure still more reliably that the eyeglass frame has not moved.

At the end of this verification step, if the eyeglass frame has not moved, then the electronic and/or computer device 100 proceeds with a step of searching for the or any anomalous zones in the outline of the bezel 11.

To do this, the device includes calculation means that:
calculate the first or second derivative of a first function of at least one of the three coordinates (R, TETA, Z) of the sensed curve 19 relative to a second function of at least one other one of the three coordinates R, TETA, Z of the sensed curve 19; and
search for anomalous zones as zones of the sensed curve 19 in which said first or second derivative has an absolute value that exceeds a threshold value VS.

Figure 4:
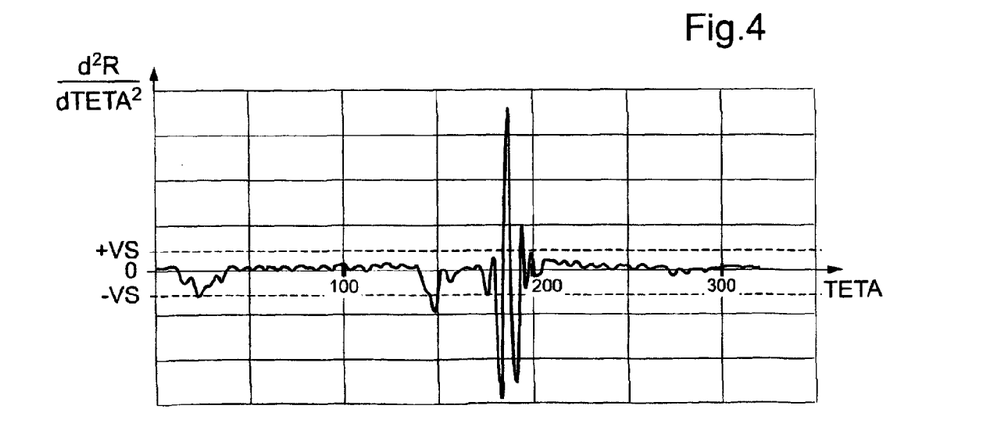
FIG. 4 is a graph plotting variation in the radial acceleration of the feeler as a function of its angular position.

Specifically, the calculation means determine as a function of the angular position TETA of the points of the sensed curve 19, the second derivative of the radial coordinates R of the points of the sensed curve 19 relative to their angular positions TETA. The result of this calculation is shown in FIGS. 3 and 4. Variation in this second derivative corresponds to variation in the radial acceleration of the feeler 8 during sensing of the bezel 11, and it is written:

$$d^2(R)/d(TETA)^2$$

In particular, it can be seen in FIG. 3 that the zones in which the radial acceleration of the feeler 8 oscillates strongly correspond to anomalous zones S1 and S2 that have been sensed poorly by the anomalous zones of the bezel 11 that have been sensed poorly. In other words, oscillations in the radial acceleration of the feeler 8 indicate that the feeler has not sensed the bezel properly.

The calculation means thus define a zone of the bezel as being an "anomalous zone" when the radial acceleration of the feeler 8 in that zone has an absolute value that exceeds a threshold value VS. This constitutes a zone that has been sensed poorly.

In this example, the threshold value VS is predetermined, i.e. it is constant regardless of the eyeglass frame installed in the tracer appliance 1. For example it can be equal to 400 micrometers per radian per radian ($\mu m/rad^2$).

In a variant, the threshold value need not be fixed, but may depend on the eyeglass frame 10 selected by the wearer and installed in the tracer appliance 1. In this variant, the threshold value is calculated as a function of the variations in the radial acceleration of the feeler 8 over the entire outline of the bezel 11. For example, this threshold value may be formed by a mean value of the variation in the radial acceleration of the feeler, or indeed by the standard variation of said variation over the entire outline of the bezel 11.

In another variant implementation of the invention, the threshold value may be selected as a function of the degree of camber of the eyeglass frame. The more the eyeglass frame is cambered, the greater the probability that zones of the bezel 11 will be poorly sensed by the feeler 8. The threshold value should therefore be selected to be smaller for frames that are very cambered. In this variant, the electronic and/or computer device 100 determines the difference between the maximum altitude Z and the minimum altitude Z of the sensed curve 19; this difference is proportional to the degree of camber of the eyeglass frame. Depending on whether this difference is respectively less than or greater than a limit value (e.g. 15.8 millimeters (mm)), the threshold value is selected to be greater or smaller.

Whatever the value selected for the threshold VS, in order to determine the angular sectors S1, S2 in which the anomalous zones of the left rim 14 of the eyeglass frame 10 are located, the electronic and/or computer device proceeds by processing the variations in the radial acceleration of the feeler 8.

Figure 5:
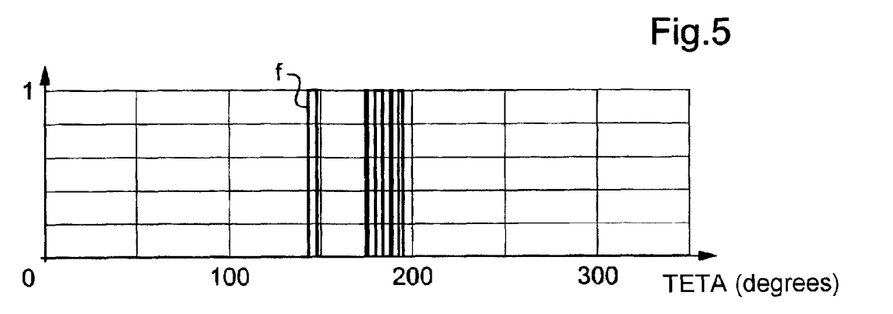
FIG. 5 is a graph showing a binary function of the angular position of the feeler, which function is equal to 1 solely in those zones of the bezel in which the radial acceleration of the feeler exceeds a threshold value.

To do this, a binary function f is defined, as shown in FIG. 5, that is a function of the angular position TETA of the feeler 8. This binary function f is defined as being equal to 1 when the radial acceleration of the feeler has an absolute value that exceeds the selected threshold value VS, and is otherwise equal to 0.

In order to reduce the time required for calculating the binary function f, this function may be defined directly as being zero in those angular sectors of rims in which the bezel is not very skew. Consequently, it can therefore be defined as being zero when the angular position TETA of the feeler lies in the range 90 degrees to 270 degrees (for the right rim this range should be −90 degrees to 90 degrees).

As shown in FIG. 4, the radial acceleration of the feeler presents oscillations such that in a given zone having large oscillations corresponding to a single anomalous zone S1, S2 of the bezel, the radial acceleration of the feeler passes successively above and below the threshold value VS. As a result, the binary function f in a given zone with large oscillations, presents a succession of squarewaves.

Figure 6:
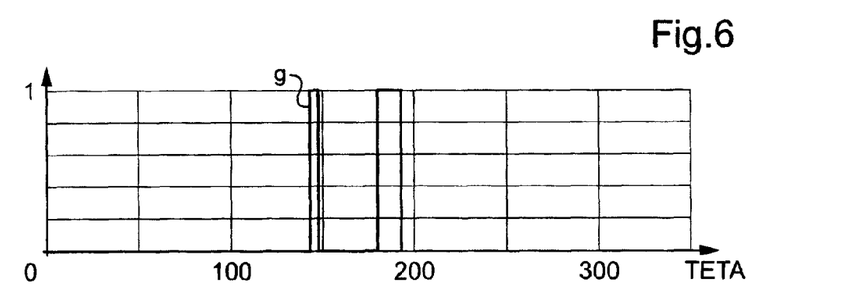
FIG. 6 is a graph showing another binary function of the angular position of the feeler, which function is equal to 1 in anomalous zones of the bezel.

In order to obtain a single squarewave for each zone having large oscillations, the electronic and/or computer device 100 determines a filtered function g as shown in FIG. 6, which is a function of the angular position TETA of the feeler 8. This filtered function g is defined as being equal to 1 not only in those angular sectors where the binary function f is equal to 1, but also in angular sectors that are situated between two squarewaves of the function f, providing those two squarewaves are close together (e.g. angularly separated by less than 3.5 degrees).

Thus, the anomalous zones of the bezel, occupying angular sectors that are spaced apart by angular gaps smaller than the above-defined minimum interval, are concatenated so as to make up together an overall anomalous zone. It can happen that several portions of the outline of the bezel are sensed poorly by the feeler. In each of these portions of the outline of the bezel, the derivative of the path of the feeler can oscillate largely about zero. Each passage of the derivative beyond the threshold value defines a small zone of the bezel as being a poorly-sensed anomalous zone. These oscillations thus generate a plurality of small anomalous zones that, in fact, correspond to a single portion of the bezel that is abnormal or poorly sensed. According to the invention, these small anomalous zones are grouped together so as to define a single overall anomalous zone so as to avoid falsifying the calculations for correcting the shape of the sensed curve.

In a variant to searching for anomalous zones by a first or second derivative exceeding a threshold, it is possible to provide for the calculation means to search for any said anomalous zones S1, S2 in the sensed curve 19 by implementing the following steps.

The electronic and/or computer device 100 subdivides the sensed curve into a plurality of subdivision portions. To improve the fineness with which the curve is analyzed, provision is made for the subdivision portions of the sensed curve 19 to overlap in part.

Thereafter, the electronic and/or computer device 100 determines a portion of interpolation curve between the ends of each subdivision portion of the sensed curve 19. For this purpose, the electronic and/or computer device 100 calculates, for each subdivision portion, the coefficients of an interpolation polynomial Q(TETA), e.g. of third order, and constructed in application of criteria concerning continuity with the zones of the sensed curve 19 that are adjacent to the corresponding subdivision portion. Naturally, it would also be possible to use an interpolation polynomial of higher order. These continuity criteria are as follows. Let P1 and P2 be the two end points that define a subdivision portion of the sensed curve, these points having respective three-dimensional coordinates as follows: R1, TETA1, Z1 and R2, TETA2, Z2. The coefficients of the interpolation polynomial Q(TETA) are then calculated so that at the point P1, the polynomial function is equal to R1 and the derivative of this function is equal to the first order derivative at the point P1 of the radial coordinate R of the sensed curve 19 relative to its angular coordinate TETA, i.e.:

$$Q(TETA1)=R1$$

and $$dQ(TETA)/dTETA_{TETA=TETA1}=dR/dTETA_{R=R1}$$

In addition, the coefficients of the interpolation polynomial Q(TETA) are calculated so that at the point P2, this polynomial function is equal to R2, and the derivative of this function is equal to the first order derivative at the point P2 of the radial coordinate R of the sensed curve 19 relative to its angular coordinate TETA, i.e.:

$$Q(TETA2)=R2$$

and $$dQ(TETA)/dTETA_{TETA=TETA2}=dR/dTETA_{R=R2}$$

This defines an interpolation polynomial as a portion of an interpolation curve associated with each subdivision portion of the sensed curve of the bezel.

Thereafter, amongst the subdivision portions of the sensed curve 19, the calculation means search for any abnormal subdivision portions that differ from the corresponding interpolation curve portion by more than a given threshold, e.g. on the basis of a maximum difference or a standard deviation between the interpolated radius and the measured radius. For example, it may be considered that a subdivision portion is abnormal when the maximum difference over said portion is greater than a threshold value lying in the range 0.5 mm to 1 mm, depending on the desired sensitivity, or when the standard deviation is greater than a threshold value lying in the range 0.1 mm to 0.2 mm, depending on the desired sensitivity.

Finally, the calculation means define the anomalous zones S1 and S2 as a function of any abnormal subdivision zones that might have been found.

In any event, at this stage, the anomalous zones S1, S2 of the bezel 11 are thus known to the electronic and/or computer device 100; they are situated in the angular sectors where the filtered function g is equal to 1. In the example shown in FIGS. 2 to 6, the outline of the bezel 11 presents two anomalous zones S1 and S2, both situated beside the temple portion of the right rim 14 of the eyeglass frame 10.

The electronic and/or computer device then proceeds with a step of correcting the shape of the sensed curve 19 in this anomalous zones S1, S2.

To do this, the device replaces those portions of the shape of the sensed curve 19 that are situated in the anomalous zones S1 and S2 with the corresponding portions as reconstructed by calculation. The shapes of these reconstructed portions are then defined mathematically by polynomial functions.

For this purpose, the electronic and/or computer device 100 calculates, for each reconstructed portion, the coefficients of an interpolation polynomial Q(TETA), e.g. of third order, and constructed in application of the criteria for continuity with the zones of the sensed curve 19 that are adjacent to the corresponding anomalous zones. Specifically, this interpolation polynomial is the same as the polynomial used above for defining the interpolation curve portion associated with each subdivision portion in the second variant implementation of the calculation for determining the anomalous zones. Naturally, it would be equally possible to use a different interpolation polynomial for this purpose, and in particular a polynomial of higher order.

With reference to FIG. 3, these continuity criteria are as follows. Let P1 and P2 be the two end points that define one of the anomalous zones S1 of the bezel 11, these points having respective three-dimensional coordinates as follows: R1, TETA1, Z1 and R2, TETA2, Z2. The coefficients of the interpolation polynomial Q(TETA) are then calculated so that at the point P1, the polynomial function is equal to R1 and the derivative of this function is equal to the first order derivative at the point P1 of the radial coordinate R of the sensed curve 19 relative to its angular coordinate TETA, i.e.:

$$Q(TETA1) = R1$$

and $$dQ(TETA)/dTETA_{TETA=TETA1} = dR/dTETA_{R=R1}$$

In addition, the coefficients of the interpolation polynomial Q(TETA) are calculated so that at the point P2, this polynomial function is equal to R2, and the derivative of this function is equal to the first order derivative at the point P2 of the radial coordinate R of the sensed curve 19 relative to its angular coordinate TETA, i.e.:

$$Q(TETA2) = R2$$

and $$dQ(TETA)/dTETA_{TETA=TETA2} = dR/dTETA_{R=R2}$$

Figure 7:
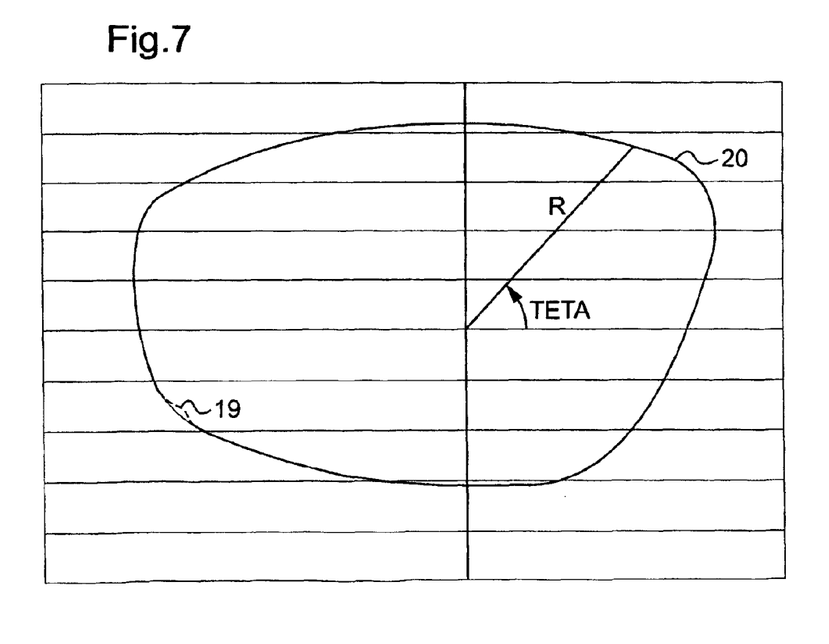
FIG. 7 is a plan view of the curve as sensed in FIG. 3, after correction.

An interpolation polynomial is thus defined for each anomalous zone of the bezel. These polynomials define reconstructed curves for replacing the poorly-sensed anomalous zones of the sensed curve 19. This assembly of curves defines a new curve 20 that is corrected and that is shown in FIG. 7, which curve is continuous and does not present any points of inflection. Its shape is thus very close to the true shape of the first longitudinal trace.

In a variant, the anomalous zones of the bezel may be reconstructed differently, by sensing these zones.

Thus, the shape of the sensed curve 19 can be corrected by sensing each anomalous zone S1, S2 of the outline of the bezel 11 a second time, and then replacing the poorly-sensed zones of the sensed curve 19 with curves of shapes that are defined from the second sensing of the bezel 11. For this purpose, the control means of the tracer appliance 1 move the feeler 8 into these anomalous zones S1, S2 so as to sense the bezel at very low speed. This very low speed makes it possible to ensure that the feeler 8 remains in contact with the bottom of the bezel 11 and does not depart from its trajectory by sliding over one of the flanks 13 of the bezel 11.

Otherwise, the shape of the sensed curve 19 can be corrected by sensing a plurality of points in the anomalous zones S1, S2 of the bezel 11, and then replacing the shape of the sensed curve 19 in these anomalous zones by a shape that is reconstructed by interpolation between said sensed points. The interpolation polynomial then used may present an order that is a function of the number of points sensed in each anomalous zone. This variant makes it possible to ensure that the reconstructed shape is very close to the true shape of the first longitudinal trace, even if the anomalous zone extends over a large angular sector.

In another implementation of the invention, the search for anomalous zones of the bezel may be performed, not from the radial acceleration of the feeler, but rather from its axial acceleration along the axis of rotation B. The threshold value used is then different, e.g. being 100 µm/rad²; the method of implementing the invention nevertheless remains identical.

The search for poorly-sensed anomalous zones of the bezel may also be performed not solely from the radial acceleration of the feeler 8, but also from its axial acceleration. Under such circumstances, when one or the other of these accelerations exceeds the threshold value that is associated therewith, then the sensed zone is defined as being an anomalous zone.

In a variant, the search for anomalous zones of the bezel may be performed, not from the radial acceleration of the feeler, but rather from its radial and/or axial speed. The implementation of this variant remains identical to that described above, with only the threshold values used changing. For example, it is possible to set a radial threshold speed for the feeler at 5 millimeters per radian (mm/rad) and an axial speed threshold at 1 mm/rad.

The present invention is not limited in any way to the implementations described and shown, and the person skilled in the art knows how to make any variation within its spirit.

The invention claimed is:

1. A method of correcting the shape of a sensed curve (19) approximating a longitudinal trace (12) of a bezel (11) of a rim (14) of an eyeglass frame (10), the method being characterized it that it comprises:
    searching for one or more anomalous zones (S1, S2), if any, of the sensed curve (19); and
    if one or more anomalous zones (S1, S2) are found, correcting the shape of each anomalous zone (S1, S2) of the sensed curve (19).

2. A method according to claim 1, wherein the search for said anomalous zones (S1, S2), if any, of the sensed curve (19) comprises searching for zones in which the first or the second derivative of a first function of at least one of the three coordinates (R, THETA, Z) of the sensed curve (19) relative to a second function of at least one other one of the three coordinates (R, THETA, Z) of the sensed curve (19) has an absolute value that exceeds a threshold value (VS), which threshold value is fixed or relates to the frame under consideration.

3. A method according to claim 2, wherein the search for any anomalous zones (S1, S2) of the sensed curve (19) comprises searching for any angular sectors (S1, S2) measured about an axis (B) lying inside the sensed curve (19) and extending generally transversely relative thereto, in which the first or second derivative of a radial and/or axial coordinate (R and/or Z) of the sensed curve (19) relative to another coordinate (TETA) of the sensed curve (19) that is an angular coordinate has an absolute value that is greater than said threshold value (VS).

4. A method according to claim 3, wherein said threshold value (VS) is calculated as a function of variations over all or part of the sensed curve (19) in the first or second derivative of a first function of at least one of the three coordinates (R, THETA, Z) of the sensed curve (19) relative to a second function of at least another one of the three coordinates (R, THETA, Z) of the sensed curve (19).

5. A method according to claim 3, wherein said threshold value (VS) is deduced at least in part from a degree of camber of the eyeglass frame (10) calculated from the shape of the sensed curve (19).

6. A method according to claim 3, wherein the search for any anomalous zones (S1, S2) is performed solely in the temporal portion of the rim (14) of the eyeglass frame (10).

7. A method according to claim 2, wherein said threshold value (VS) is predetermined and is the same for a plurality of eyeglass frames (10).

8. A method according to claim 2, wherein said threshold value (VS) is calculated as a function of variations over all or part of the sensed curve (19) in the first or second derivative of a first function of at least one of the three coordinates (R, THETA, Z) of the sensed curve (19) relative to a second function of at least another one of the three coordinates (R, THETA, Z) of the sensed curve (19).

9. A method according to claim 8, wherein the threshold value (VS) is calculated as a function of the standard deviation of the variation over all or part of the sensed curve (19) in the first or second derivative of a first function of at least one of the three coordinates (R, THETA, Z) of the sensed curve (19) relative to a second function of at least another one of the three coordinates (R, THETA, Z) of the sensed curve (19).

10. A method according to claim 2, wherein said threshold value (VS) is deduced at least in part from a degree of camber of the eyeglass frame (10) calculated from the shape of the sensed curve (19).

11. A method according to claim 2, wherein the search for any anomalous zones (S1, S2) is performed solely in the temporal portion of the rim (14) of the eyeglass frame (10).

12. A method according to claim 1, wherein the search for said anomalous zones (S1, S2), if any, of the sensed curve (19) comprises the following steps:
  subdividing the sensed curve (19) into a plurality of subdivision portions;
  calculating an interpolation curve portion between the ends of each subdivision portion of the sensed curve (19);
  searching amongst the subdivision portions of the sensed curve (19) for any abnormal subdivision portions that differ from the corresponding interpolation curve portion by more than a given threshold value; and
  determining said anomalous zones (S1, S2) as a function of any abnormal subdivision portions found.

13. A method according to claim 12, wherein the subdivision portions of the sensed curve (19) overlap in part.

14. A method according to claim 1, wherein the shape of each anomalous zone (S1, S2) of the sensed curve (19) is corrected by sensing each anomalous zone (S1, S2) of the outline of the bezel (11) again, the feeler (8) being controlled during this new sensing operation in application of second transverse and/or longitudinal position and/or force setpoints that depend on the anomalous zones (S1, S2) found.

15. A method according to claim 1, wherein the shape of each anomalous zone (S1, S2) of the sensed curve (19) is corrected by replacing the shape of each anomalous zone (S1, S2) of the sensed curve (19) with a shape that is reconstructed by calculation in application of continuity criteria involving differentiation of order greater than or equal to 1 relative to zones of the sensed curve (19) that are adjacent to said anomalous zone (S1, S2).

16. A method according to claim 1 wherein the shape of each anomalous zone (S1, S2) of the sensed curve (19) is corrected by sensing a plurality of points of the anomalous zone (S1, S2) of the bezel (11) and replacing the shape of the sensed curve (19) in each anomalous zone (S1, S2) with a shape that is reconstructed by interpolation based on said sensed points.

17. A method of acquiring the shape of the outline of a bezel (11) of a rim (14) of an eyeglass frame (10), the method comprising sensing the bezel (11) by driving a feeler (8) to slide or roll along the longitudinal direction of the bezel (11), the feeler being urged transversely towards the bottom of the bezel (11), with the shape deduced for a sensed curve (19) approximating a longitudinal trace (12) of the bezel (11), and said shape of the sensed curve being corrected by the method according to claim 1.

18. A method according to claim 17, wherein the bezel (11) is sensed by controlling the feeler (8) in application of first transverse and/or longitudinal position and/or force setpoints, the shape of each anomalous zone (S1, S2) of the sensed curve (19) being corrected by sensing each anomalous zone (S1, S2) of the outline of the bezel (11) again, the feeler (8) being controlled during this new sensing operation in application of second transverse and/or longitudinal position and/or force setpoints that are different from said first setpoints.

19. A method according to claim 17, including an additional step of verifying that the eyeglass frame (10) has remained stationary while sensing the bezel (11).

20. A method according to claim 19, including, if the eyeglass frame (10) has not remained stationary, a new step of sensing the entire outline of the bezel (11) from which the shape of the sensed curve (19) is deduced.

* * * * *